Sept. 2, 1947.  B. H. HIGGS  2,426,688
THERMALLY FORMING A CAVITY IN A BODY OF MINERAL MATERIAL
Filed Nov. 30, 1943
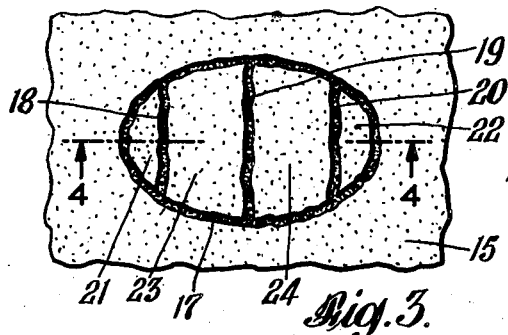
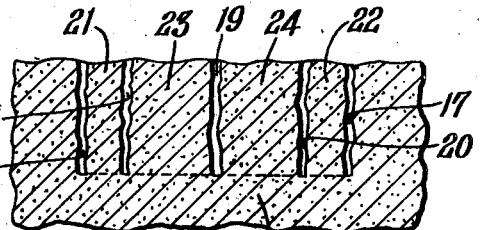
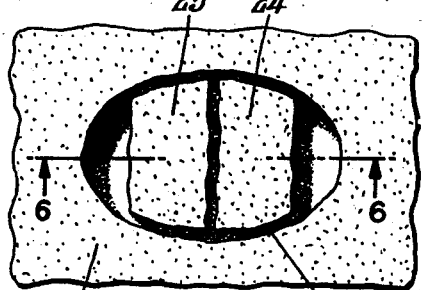
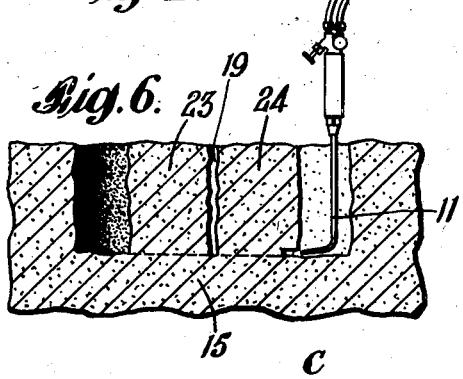
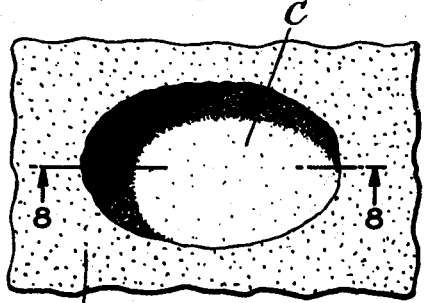
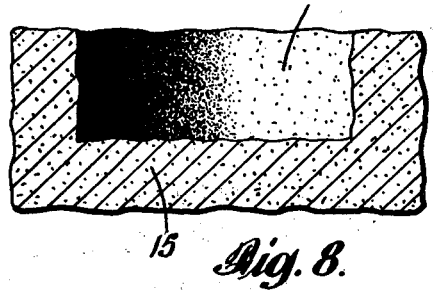
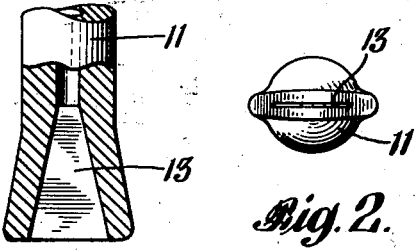
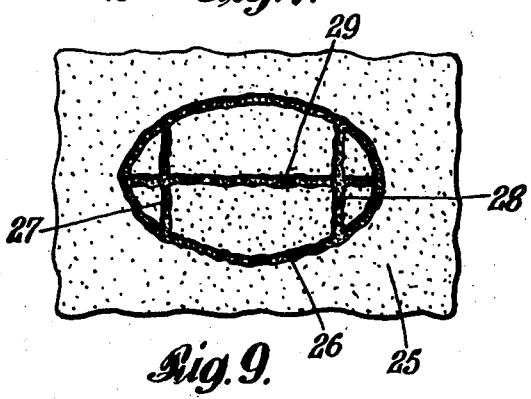
INVENTOR
BRYANT H. HIGGS
BY
ATTORNEY Patented Sept. 2, 1947

2,426,688

UNITED STATES PATENT OFFICE 2,426,688

THERMALLY FORMING A CAVITY IN A BODY OF MINERAL MATERIAL

Bryant H. Higgs, Salt Lake City, Utah, assignor to The Linde Air Products Company, a corporation of Ohio Application November 30, 1943, Serial No. 512,404

7 Claims. (Cl. 262—1)

This invention relates to thermally forming a cavity in a body of mineral material. More particularly, the invention relates to cavitating non-metallic rocks such as quartzite, dolomite, and sandstone, having the property of spalling off as finely-divided, unfused particles when high temperature localized heat is applied thereto.

The principal object of the present invention is the provision of a novel method of thermally forming a cavity in a body of mineral material without cracking the body. Another object is the provision of such a method which may be carried out at low cost and rapidly. Still another object is the provision of a novel method of forming a cavity in a mineral body by employing a gas flame to remove material therefrom.

The above and other objects, and the novel features of the invention, will become apparent from the following description, having reference to the accompanying drawing, wherein:

Figs. 1 and 2 are a vertical sectional view and an end elevational view, respectively, of one form of blowpipe nozzle which has been found especially useful for performing the method of the invention;

Figs. 3, 5, and 7 are plan views showing successive steps in the method of forming a cavity;

Figs. 4, 6, and 8 are cross-sectional views taken along the lines 4—4, 6—6, and 8—8, respectively, in Figs. 3, 5, and 7, respectively; and Fig. 9 is a plan view showing a slightly modified procedure for forming a cavity in a body of mineral material.

Generally, my method for forming a cavity in a body of mineral material comprises forming at least one groove in the core or portion to be removed, by applying along a selected path localized heat of sufficient intensity to separate material from the mass. Then, the core is removed. Preferably, the core is undercut, starting from the bottom of the groove, by applying localized heat to the core, after which it may be removed from the body in one or more large chunks. When the cavity is to be formed wholly within the outline of the body of mineral material, the cavity should be outlined with a groove, and, if the core within the outline is quite large, one or more additional grooves should be thermally cut across the core from one side of the outline to the other prior to undercutting.

My method will be described more in detail, by way of illustration, as applied to the formation of a large cavity in a large block of heat-spallable mineral material, such as quartzite, by applying an oxy-acetylene flame along selected paths to heat-spall material from the body. It is to be understood, however, that other sources of heat, such as an electric arc device, can be employed without departing from the principles of the invention. Furthermore, it is not always necessary to undercut the core, since the portions of the core may sometimes be removed simply by heating them sufficiently to cause them to crack away from the mineral body, or by wedging them free from a side. Wedging the core free is particularly effective where the cross section of the core is quite thin at the bottom of the groove, or where a seam of foreign material occurs in the stone at the place of severance.

As shown in Figs. 1 and 2, one form of blowpipe tip 11 for performing the method of the invention has a narrow flaring orifice 13, so constructed as to form a thin, wide, ribbon-like or knife-like gas flame for heating the mineral material. The nozzle 11 may be connected to any conventional welding blowpipe which is adapted to supply a combustible gas mixture, such as an oxy-acetylene mixture.

Figs. 3 and 4 show the first steps in forming a deep cavity wholly within the outline of a body 15 of heat-spallable quartzite or similar mineral material. I first outline the cavity with an annular groove or kerf 17 by traversing the desired path with the flame and heat-spalling material from the body 15 along the periphery of the cavity, leaving a core within the outline. I then cut a plurality of grooves, such as the three parallel grooves 18, 19, and 20, through the core from one side of the groove 17 to the other, by similarly heat-spalling material from the body 15 along any selected paths. All of the grooves 17, 18, 19, and 20 advantageously are formed to the full depth of the desired cavity.

Although other kinds of gas flame may be used, it has been found advantageous to form the grooves 17, 18, 19, and 20 with the ribbon-like oxy-acetylene flame from the nozzle 11, and to accomplish the heat-spalling by arranging the flame with its widest dimension lengthwise of the groove being formed, in a manner analogous to cutting with a knife. A thin groove is rapidly formed in this way without excessively heating the mineral body, thus preventing cracking of the body by excessive expansion. Additionally, the nozzle and flame may be repeatedly raised and lowered as the cut is traversed, thereby inducting air into the groove to remove the detritus and to assist in cooling the rock. Other shapes and arrangements of flame may be used, however, where it is desirable to produce a wider groove.

I next remove the two end pieces 21 and 22 of the core, outlined by the grooves 17 and 18, and the grooves 17 and 20, respectively. This is accomplished by positioning the nozzle 11 at the bottom of one of the grooves bounding the piece to be removed, and directing the flame sideways against the adjoining material of the end piece. The nozzle is then moved along the groove, undercutting the portion to be removed by heat-spalling material therefrom. Fig. 6 clearly shows the manner of positioning the blowpipe for undercutting the core portions from the body. After the portions 21 and 22 have been completely undercut, or have been undercut sufficiently to break loose from the body, they are removed bodily, leaving the body of mineral material in the condition shown in Figs. 5 and 6.

After removing the two end portions of the core, I then undercut the two center portions 23 and 24 in an identical manner, as shown in Figs. 5 and 6, and remove them bodily from the cavity. Figs. 1 and 8 show the body 15 formed with the completed cavity C. The bottom of the cavity may be dressed by passing the flame over the bottom to spall off any excess material.

Fig. 9 shows a different arrangement of grooves in a mineral body 25. The core within the outline groove 26 is separated into six parts by two parallel grooves 27 and 28, and a third groove 29 bisecting the parallel grooves. The several parts of the core are undercut in the manner described above, and removed bodily to form a cavity.

Although the method described above is effective without water cooling of the mineral body, it is sometimes helpful to dissipate heat by spraying water on the body, or by partially submerging the body in water while forming the cavity.

The method for forming a cavity described in detail above is particularly advantageous because it prevents overheating and undue expansion of the body of mineral material, thereby avoiding cracking. This is believed to depend on the several parts of the core between the several grooves absorbing much of the heat of the flame and dissipating it to the atmosphere, thus preventing the main portion of the mineral body from being overheated. Furthermore, the method may be performed rapidly and economically because the several parts of the core are separated from the body by grooves and are removed bodily, thus obviating the need for completely disintegrating the core. It is apparent that relative movement may be effected between the flame and the body 15 either by moving the nozzle 11 while holding the body stationary, or by moving the body while holding the blowpipe stationary.

One embodiment of the method of the invention has been described in detail above, by way of illustration only. It is to be understood that changes in the details of the method, and in the sequence of steps, may be made within the scope of the invention as defined by the claims appended hereto.

What is claimed is:

1. A method of forming a cavity in a body of mineral material by removing a portion from such body, comprising forming at least one groove in said portion by applying thereto along a selected path localized heat of sufficient intensity to remove material; undercutting such portion by applying localized heat thereto, such undercutting starting from the bottom of said groove; and removing such undercut portion from said body.

2. A method of forming a cavity in a body of heat-spallable mineral material by removing a portion from such body, comprising forming at least one groove in said portion by applying thereto along a selected path heat of sufficient intensity to spall material from such portion; undercutting such portion by applying thereto heat of sufficient intensity to spall material from said body, such undercutting starting from the bottom of said groove; and removing such undercut portion from said body.

3. A method according to claim 1, wherein the localized heat is supplied by a gas flame.

4. A method according to claim 1, wherein the localized heat is supplied by a ribbon gas flame, said flame being arranged with its widest dimension lengthwise of such groove during formation thereof.

5. A method of forming a cavity in a body of a heat-spallable mineral material, comprising outlining such cavity with a groove by applying heat of sufficient intensity to remove material from said body along the outline of such cavity, leaving a core within such outline; cutting at least one groove across said core from one side of such outline to the other by applying heat of sufficient intensity to remove material from said body along at least one selected path; undercutting such score by applying localized heat thereto; and thereafter removing said core from said body.

6. A method of forming a cavity in a body of a heat-spallable mineral material, comprising outlining such cavity with a groove by applying heat of sufficient intensity to remove material from said body along the outline of such cavity, leaving a core within such outline; cutting at least one groove across said core from one side of such outline to the other by applying heat of sufficient intensity to remove material from said body along at least one selected path; undercutting said core by applying heat of sufficient intensity to remove material from said body adjacent to the bottom of said cavity; and thereafter removing said core from said body.

7. A method of forming a cavity in a body of mineral material by removing a portion from such body, comprising forming at least one groove in said portion by applying thereto along a selected path localized heat of sufficient intensity to remove material; undercutting such portion by applying localized heat thereto; and removing such undercut portion from said body.

BRYANT H. HIGGS.

REFERENCES CITED

The following references are of record in the file of this patent:

UNITED STATES PATENTS

| Number | Name | Date |
|---|---|---|
| 1,985,080 | Crowe | Dec. 18, 1934 |
| 2,092,897 | Sudhaus | Sept. 14, 1937 |
| 2,111,872 | Rea | Mar. 22, 1938 |
| 2,129,672 | Bucknam | Sept. 13, 1938 |
| 2,286,191 | Aitchison | June 16, 1942 |

FOREIGN PATENTS

| Number | Country | Date |
|---|---|---|
| 400,370 | Germany | Aug. 18, 1924 |